United States Patent
Plaindoux et al.

(10) Patent No.: US 9,970,359 B2
(45) Date of Patent: May 15, 2018

(54) FLAME RESISTANT SHIELD

(75) Inventors: Cedric Plaindoux, Bordeaux (FR); Simon Schers, Saint Medard En Jalles (FR); Benjamin Moura, Bordeaux (FR)

(73) Assignee: ARIANEGROUP SAS (FR)

( * ) Notice: Subject to any disclaimer, the term of this patent is extended or adjusted under 35 U.S.C. 154(b) by 0 days. days.

(21) Appl. No.: 14/343,635

(22) PCT Filed: Sep. 7, 2012

(86) PCT No.: PCT/EP2012/067531
§ 371 (c)(1),
(2), (4) Date: May 21, 2014

(87) PCT Pub. No.: WO2013/034704
PCT Pub. Date: Mar. 14, 2013

(65) Prior Publication Data
US 2014/0322479 A1 Oct. 30, 2014

(30) Foreign Application Priority Data

Sep. 9, 2011 (FR) ...................... 11 58015

(51) Int. Cl.
*B32B 7/00* (2006.01)
*B32B 7/02* (2006.01)
(Continued)

(52) U.S. Cl.
CPC ................. *F02C 7/25* (2013.01); *B64C 7/02* (2013.01); *F05D 2300/131* (2013.01);
(Continued)

(58) Field of Classification Search
CPC ............... F02C 7/25; F05D 2300/5024; F05D 2300/30; F05D 2300/603; B64C 7/02;
(Continued)

(56) References Cited

U.S. PATENT DOCUMENTS 3,779,006 A 12/1973 Lewis et al.
4,472,920 A * 9/1984 Simpson ................... E04B 1/14
52/222

(Continued)

FOREIGN PATENT DOCUMENTS

EP 0411845 A1 2/1991
GB 2468484 A 9/2010
WO 2009134299 A2 11/2009

OTHER PUBLICATIONS

International Search Report, Application PCT/EP2012/067531, dated Oct. 2, 2012.

*Primary Examiner* — Joanna Pleszczynska
(74) *Attorney, Agent, or Firm* — Perman & Green, LLP

(57) ABSTRACT

A flame resistant shield includes two opposing walls between which are positioned at least: a first insulating layer, the first layer being capable of distributing heat in the plane formed by the first layer and being insulating across its thickness, a second insulating layer, one of the opposing walls which covers the first layer being produced from a refractory antioxidant material or having at least the surface intended to be exposed to flames covered with a material preventing this surface from being oxidized, the other wall being a support.

8 Claims, 1 Drawing Sheet

(51) Int. Cl.
*F02C 7/25* (2006.01)
*B64C 7/02* (2006.01)

(52) U.S. Cl.
CPC .. *F05D 2300/30* (2013.01); *F05D 2300/5024* (2013.01); *F05D 2300/522* (2013.01); *F05D 2300/603* (2013.01); *Y10T 428/24008* (2015.01); *Y10T 428/266* (2015.01)

(58) Field of Classification Search
CPC .. B32B 5/02; B32B 5/14; B32B 17/06; B32B 7/00; B32B 7/02; Y10T 428/24008; Y10T 428/266; Y10T 428/24
USPC ............... 428/99, 105, 113, 114, 448, 921; 415/200; 60/39.091, 39.11; 169/48
See application file for complete search history.

(56) References Cited

U.S. PATENT DOCUMENTS

| | | | | |
|---|---|---|---|---|
| 5,831,225 | A * | 11/1998 | Campbell | ............... 181/284 |
| 6,457,748 | B1 * | 10/2002 | Webb et al. | ............... 285/47 |
| 2011/0086211 | A1 * | 4/2011 | Pfeffer | ............... B32B 5/26 |
| | | | | 428/213 |
| 2011/0114342 | A1 * | 5/2011 | Ono et al. | ............... 169/45 |
| 2011/0274514 | A1 * | 11/2011 | Lee | ............... F16B 39/24 |
| | | | | 411/368 |

\* cited by examiner

FLAME RESISTANT SHIELD

CROSS-REFERENCE TO RELATED APPLICATIONS

This application is the National Stage of International Application No. PCT/EP2012/067531 having International filing date, 7 Sep. 2012, which designated the United States of America, and which International Application was published under PCT Article 21 (s) as WO Publication 2013/034704 A1 and which claims priority from, and benefit of, French Application No. 1158015 filed on 9 Sep. 2011, the disclosures of which are incorporated herein by reference in their entireties.

BACKGROUND

The presently disclosed embodiment relates to a torch flame resistant shield used in aeronautics to protect the immediate surroundings of engine combustion chambers. It also relates to an aircraft engine nacelle equipped with such a flame resistant shield.

It is known to use a flame resistant shield to protect the vital parts of an aircraft, such as the kerosene supply and the hydraulic and electrical ducts, which are at risk of exposure to torch flames. This flame resistant shield is generally placed on the engine pylons of an aircraft, the engine being a gas turbine engine or the like.

A torch flame corresponds to an accidental leak of combustion gas out of the combustion chamber. The gases are typically at high temperatures, close to 1600° C., and at a pressure of several tens of bars. This temperature is high enough to cause damage to the surrounding vital parts.

Since this flame resistant shield must withstand an accidental exposure to a torch flame, the specifications for this type of shield are consequently very strict:

gas temperature of 1650° C., the gas being certainly oxidizing, pressure of 37 bar at the source of the flame, distance of 120 mm from the shield to the source of the flame, flame diameter of 25.4 mm at the source, 3 minutes' exposure time, during which the shield must not allow the flame through, its opposite face from the flame having to remain at a temperature that is not too high.

Moreover, the flame resistant shield must be able to withstand, under normal operating conditions, an extreme environment and thus tolerate temperatures of the order of 400° C.

It must also be as compact as possible, that is to say with a thickness typically less than 6 mm, while having as little mass as possible for applications in the field of aeronautics.

The flame resistant shield of the prior art typically consists of a firewall made of tantalum which has been treated against oxidation, of thermal insulators based on ceramic fibers, in particular asbestos, impregnated with resin such as a phenolic resin, and possibly a support.

The tantalum layer has a thickness of the order of 0.4 mm whereas the asbestos layer has a thickness of 3.18 mm.

However, these flame resistant shields cannot guarantee continuous integrity at 300° C. as there is currently no organic resin which does not decompose when exposed to such temperatures.

Moreover, it is observed that these flame resistant shields of the prior art age rapidly, which necessitates more frequent and costly replacements.

When removing such a flame resistant shield, which has been in service for a fair while, it can be observed that the binder has disappeared.

As the asbestos fibers have lost their binder, they turn to dust during removal.

Dealing with these shields therefore causes environmental problems due to the extremely harmful nature of the asbestos particles which can thus be dispersed.

Such a flame resistant shield is obviously no longer able to protect the vital parts of the aircraft.

SUMMARY

The presently disclosed embodiment aims to tackle the abovementioned drawbacks of the prior art by proposing a flame resistant shield which is of simple design and mode of operation, which conforms to the current environmental requirements, in particular in that it is free of asbestos, and which is compatible with the requirement of integrity under ambient conditions.

To that end, the aspects of the disclosed embodiment relates to a flame resistant shield. According to the aspects of the disclosed embodiment, this shield comprises two opposing walls between which there are placed at least:

a first insulating layer, said first layer being able to dissipate heat in the plane formed by said layer while being insulating in its thickness, a second insulating layer, wherein one of said opposing walls which covers said first layer is made of an antioxidant refractory material or at least that face which is designed to be exposed to flames is covered with a material preventing oxidation of this face, the other wall being a support While the wall, which is refractory and stable from an oxidation point of view, is designed to be exposed to torch flames, the support wall is designed to be placed close to the object which is to be protected from the heat.

Advantageously, the thermal conductivity of the first insulating layer in the plane formed thereby makes it possible to limit the formation of hotspots on the shield. Indeed, since the torch flame is by definition localized, the role of the first insulating layer is to spread the zone heated by the torch flame, such that localized insulation can be replaced with insulation over a larger surface, and thus to make more use of the insulation and increase its effectiveness.

In various particular aspects of the disclosed embodiment of this flame resistant shield, each having its own particular advantages and able to be combined in numerous technically feasible ways:

the first and second insulating layers contain no binder such as a resin, the first insulating layer is made of an orthotropic conductive material.

The radial thermal conductivity is preferably greater than 100 $W \cdot m^{-1} \cdot K^{-1}$ at 20° C., and better still greater than 140 $W \cdot m^{-1} \cdot K^{-1}$ at 20° C., whereas the axial thermal conductivity is less than 10 $W \cdot m^{-1} \cdot K^{-1}$ at 20° C., and better still less than 6 $W \cdot m^{-1} \cdot K^{-1}$ at 20° C.

"Axial thermal conductivity" is understood as the conductivity measured in the direction of the compression of the flame resistant shield, and "radial thermal conductivity" is understood as the conductivity measured in the direction transverse to the compression of the flame resistant shield.

It is preferably made of graphite, such as Papyex®.

Said second insulating layer is an insulating layer having a thermal conductivity of less than 1 $W \cdot m^{-1} \cdot K^{-1}$ at 20° C.

This second insulating layer preferably has a thermal conductivity less than 0.05 W·m⁻¹·K⁻¹ at 20° C., and better still less than or equal to 0.025 W·m⁻¹·K⁻¹ at 20° C.

This second insulating layer can be made of mineral fibers such as amorphous silica or glass fibers, or combinations of these. Asbestos fibers are excluded therefrom.

This second insulating layer can be a microporous insulating panel such as the high-temperature thermal insulation panel marketed by Microtherm®. Such a microporous insulating panel has a thermal conductivity less than 0.022 W·m⁻¹·K⁻¹ at room temperature.

The support being made of a titanium alloy, it has a thickness greater than or equal to 0.6 mm, the shield comprises attachments for securing the shield assembly.

Advantageously, each of these attachments comprises an insert by means of which it is possible to control the thickness of the layers held between the opposing walls. Each insert is advantageously placed directly between the two opposing walls.

The aspects of the disclosed embodiment also relates to an engine nacelle equipped with a flame resistant shield as described above.

Preferably, this nacelle being an aircraft engine nozzle, the flame resistant shield is placed between the combustion equipment of the engine and those parts of the aircraft which are to be protected.

BRIEF DESCRIPTION OF THE DRAWINGS

The aspects of the disclosed embodiment will be described in more detail with reference to the appended drawings, in which.

DETAILED DESCRIPTION

Figure 1:
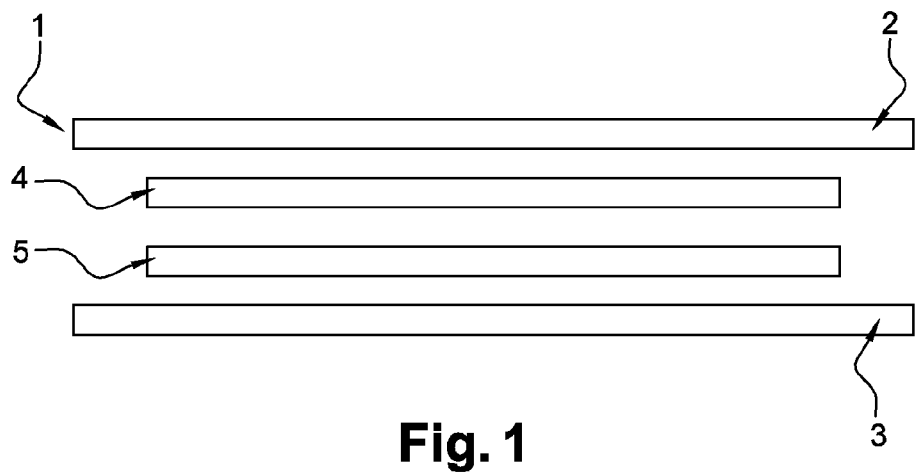
FIG. 1 is a cross section view of a flame resistant shield according to one particular aspect of the disclosed embodiment, wherein the shield is represented in an exploded view and without its assembling members for reasons of clarity.
Figure 2:
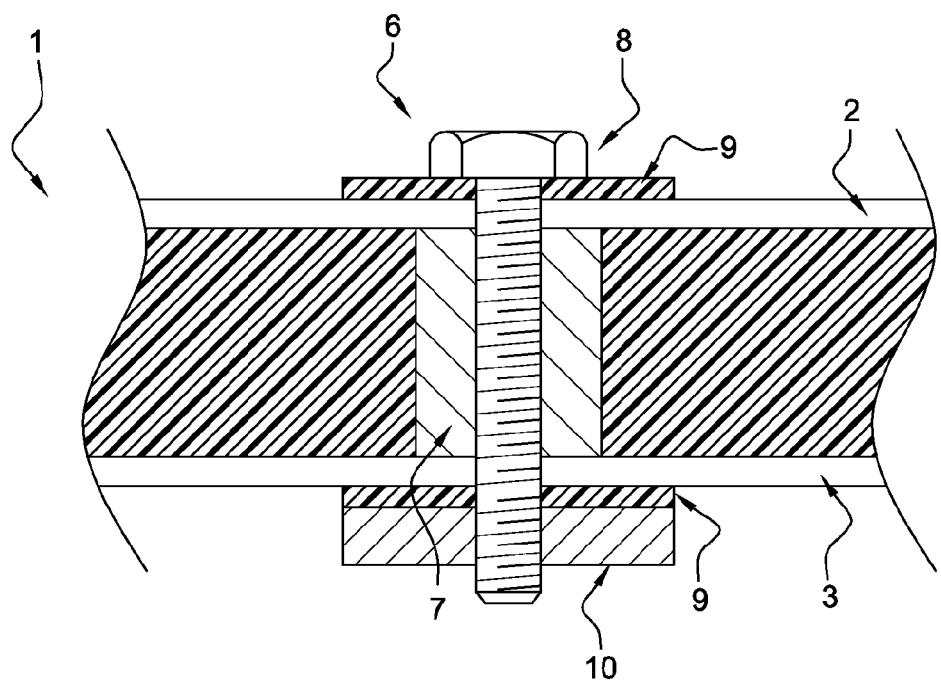
FIG. 2 is a partial enlarged view in cross section of a flame resistant shield at one of its assembling members.

FIGS. 1 and 2 show schematically a flame resistant shield 1 according to one aspect of the presently disclosed embodiment.

This flame resistant shield comprises a sheet 2 of refractory material, both faces of which have been treated with a material preventing oxidation of this sheet 2 when it is exposed to a torch flame.

The flame resistant shield 1 also comprises another sheet 3 acting as a support. An assembly of layers 4, 5 is held between these two sheets 2, 3.

That face of the sheet 2 which faces away from the face designed to be exposed to the attack of the torch flame is in contact with a first insulating layer 4. This first insulating layer 4 is able to dissipate the heat in the plane formed by this layer while being insulating in its thickness. This first insulating layer 4 is preferably made of an orthotropic conductive material.

A second insulating layer 5 is in contact with the sheet 3 which acts as a support. This second insulating layer 5 is preferably made of mineral products without resin so as not to have any temperature aging problems.

Since the insulating layers 4, 5 are without resin, they therefore have no mechanical integrity. Because the thermal insulation properties of these insulating layers 4, 5 depend directly on their density, assembly elements 6 of the shield, forming spacers, are placed in direct contact with the opposing walls 2, 3 so as to control the thickness of the layers 4, 5 held between these opposing walls, including under mechanical loads.

The sheet 2 of refractory metal is preferably made of molybdenum, the two faces of this sheet being treated with boron silicate.

The first insulating layer 4 is made of Papyex®, such that it is possible to take advantage of the orthotropic conductive properties of this material.

The second insulating layer 5 is a high-performance silica-based microporous insulating panel such as that marketed under the name Microtherm®. The sheet 3 serving as a support is a titanium alloy such as TA6V (Ti-6Al-4V).

In one particular aspect of the presently disclosed embodiment, the sheet 2 of refractory metal made of molybdenum has a thickness of 1 mm, its two faces being treated with boron silicate to a thickness of 0.1 mm.

The first insulating layer 4 is made of Papyex®, reference NZ 998 marketed by CARBONE LORRAINE, which has a carbon content of greater than 93.8% and a temperature resistance under an oxidizing atmosphere of at least 500° C. This first layer 4 has a thickness of 1 mm.

The second insulating layer 5, which has a thickness of 3 mm, is made of Microtherm®, reference Super G marketed by MICROTHERM, which has a thermal conductivity of 0.0221 W·m⁻¹·K⁻¹ at 100° C. and an area density of 15.7 kg/m².

The sheet 3 acting as a support has a thickness of 0.6 mm. The shield 1 has a theoretical total thickness of 5.8 mm and an actual thickness of between 5.8 mm and 6 mm due to possible variations in the thickness of each layer.

FIG. 2 is a partial enlarged cross section view of a flame resistant shield at one of its assembly members 6. For reasons of clarity, the different insulating layers have not been separately identified. The elements of FIG. 2 bearing the same references as the elements of FIG. 1 represent the same objects which will not be described anew herein below.

These assembly members 6 of the flame resistant shield ensure that the thickness of the layers held between the opposing walls 2, 3, and thus the density of each insulating layer, can be controlled, which ensures that the thermal insulation properties of each of these layers is maintained.

These assembly members 6 for securing the shield assembly each comprise:

one hollow insert 7 of cylindrical shape, interposed directly between the opposing walls 2, 3 and one bolt 8, washers 9 and one nut 10 by means of which the various constituent elements of the shield can be secured.

The hollow insert 7 is thus integrated into the thickness of the stack formed by the different insulating layers 4, 5, having its ends in direct contact with the opposing walls 2, 3. The distance separating these walls 2, 3 is thus advantageously controlled.

In a purely illustrative manner, the washers 9 are gauzes of silica having a density of 150 kg/m³. The hollow insert 7 is made of a very low density (VLD) material, that is to say having a density of less than 80 kg/m³.

The bolt 8 and the nut 10 are made of titanium or, better still, molybdenum protected against oxidation.

These assembly members 6 are advantageously placed around the perimeter of the shield 1.

What is claimed is:

1. A flame resistant shield comprising:

two opposing walls between which there are placed at least, a first insulating layer, said first insulating layer being able to dissipate heat in the plane formed by said first insulating layer while being insulating in its thickness;

a second insulating layer, wherein one of said opposing walls which covers said first insulating layer is made of an antioxidant refractory material or at least a face of the one of the said opposing walls which is designed to be exposed to flames is covered with a material preventing oxidation of this face of the one of the said opposing walls, the other wall being a support; and further comprising attachments disposed at least partially between the two opposing walls for securing the two opposing walls and the first and second insulating layers of the shield together, the attachments having a configuration that bidirectionally fixes a gap between the two opposing walls that effects definition and control, between the two opposing walls, of a density of each insulating layer in its entirety, said attachments each comprise a hollow insert of cylindrical shape interposed directly between the two opposing walls, one bolt, washers, and one nut.

2. The shield as claimed in claim 1, wherein said first and second insulating layers contain no resin.

3. The shield as claimed in claim 1, wherein said first insulating layer is made of an orthotropic conductive material.

4. The shield as claimed in claim 3, wherein a radial thermal conductivity of said first insulating layer is greater than 100 $W \cdot m^{-1} \cdot K^{-1}$ at 20° C. whereas its axial thermal conductivity is less than 10 $W \cdot m^{-1} \cdot K^{-1}$ at 20° C.

5. The shield as claimed in claim 1, wherein said second insulating layer has a thermal conductivity of less than 1 $W \cdot m^{-1} \cdot K^{-1}$ at 20° C.

6. The shield as claimed in claim 5, wherein said second insulating layer has an area density of 15.7 $kg/m^2$.

7. The shield as claimed in claim 1, wherein, the support being made of a titanium alloy, has a thickness greater than or equal to 0.6 mm.

8. An engine nacelle equipped with a flame resistant shield as claimed in claim 1.

* * * * *